(12) United States Patent
Landes et al.

(10) Patent No.: US 9,005,826 B2
(45) Date of Patent: Apr. 14, 2015

(54) ELECTROCHEMICAL BATTERY

(75) Inventors: Harald Landes, Rückersdorf (DE); Alessandro Zampieri, Singapore (SG)

(73) Assignee: Siemens Aktiengesellschaft, Munich (DE)

( * ) Notice: Subject to any disclaimer, the term of this patent is extended or adjusted under 35 U.S.C. 154(b) by 359 days.

(21) Appl. No.: 13/515,128

(22) PCT Filed: Dec. 7, 2010

(86) PCT No.: PCT/EP2010/069059
§ 371 (c)(1),
(2), (4) Date: Oct. 3, 2012

(87) PCT Pub. No.: WO2011/070006
PCT Pub. Date: Jun. 16, 2011

(65) Prior Publication Data
US 2013/0034784 A1    Feb. 7, 2013

(30) Foreign Application Priority Data

Dec. 10, 2009 (DE) .......................... 10 2009 057 720

(51) Int. Cl.
| | |
|---|---|
| *H01M 12/02* | (2006.01) |
| *H01M 12/08* | (2006.01) |
| *H01M 4/134* | (2010.01) |
| *H01M 4/86* | (2006.01) |
| *H01M 12/06* | (2006.01) |

(52) U.S. Cl.
CPC ............ *H01M 4/134* (2013.01); *H01M 4/8615* (2013.01); *H01M 12/06* (2013.01); *H01M 12/08* (2013.01); *H01M 2300/0065* (2013.01); *Y02E 60/122* (2013.01); *Y02E 60/50* (2013.01)

(58) Field of Classification Search
USPC ........... 429/417, 403, 444, 432, 442, 209, 49, 429/407, 405
See application file for complete search history.

(56) References Cited

U.S. PATENT DOCUMENTS

| | | |
|---|---|---|
| 4,204,033 A | 5/1980 | Meissner |
| 5,213,908 A | 5/1993 | Hagedorn |
| 5,492,777 A | 2/1996 | Isenberg et al. |
| 7,485,385 B2 | 2/2009 | Seccombe et al. |
| 2005/0089738 A1 | 4/2005 | Tao et al. |
| 2005/0089739 A1 | 4/2005 | Seccombe, Jr. et al. |

(Continued)

FOREIGN PATENT DOCUMENTS

| | | |
|---|---|---|
| CN | 101061596 A | 10/2007 |
| DE | 10050554 | 4/2002 |

(Continued)

OTHER PUBLICATIONS

German Office Action for German Priority Patent Application No. 10 2009 057 720.3, issued on Aug. 2, 2010.

(Continued)

*Primary Examiner* — Kenneth Douyette
(74) *Attorney, Agent, or Firm* — Staas & Halsey LLP

(57) ABSTRACT

A battery has a cathode and an anode, between which a solid electrolyte is disposed. The battery has a process gas feed on the cathode side. The battery is characterized in that an electrically conductive supporting body is disposed on the cathode surface. At least one chamber connected to the anode has a porous, oxidizable material and a redox pair that is gaseous at an operating temperature of the battery.

18 Claims, 1 Drawing Sheet

(56) References Cited

U.S. PATENT DOCUMENTS

| | | |
|---|---|---|
| 2009/0029203 A1 | 1/2009 | Wagner et al. |
| 2009/0214904 A1 | 8/2009 | Zhou |
| 2011/0259440 A1 | 10/2011 | Kawashima et al. |

FOREIGN PATENT DOCUMENTS

| | | |
|---|---|---|
| DE | 102005018291 | 10/2006 |
| DE | 102009057720.3 | 12/2009 |
| EP | 0807322 | 5/2000 |
| JP | 11-501448 | 2/1999 |
| JP | 2008-537296 | 9/2008 |
| JP | 2009-248611 | 10/2009 |
| WO | 98/15023 | 4/1998 |
| WO | PCT/EP2010/069059 | 12/2010 |

OTHER PUBLICATIONS

International Search Report for PCT/EP2010/069059, mailed on Mar. 23, 2011.
European Office Action for related European Application No. 10 798 746.3, issued May 13, 2014, 6 pages.
Chinese Office Action for related Chinese Patent Application No. 201080056048.4, issued Sep. 18, 2014, 18 pages.
Office Action mailed Aug. 25, 2014 for corresponding Canadian Patent Application No. 2,783,916.

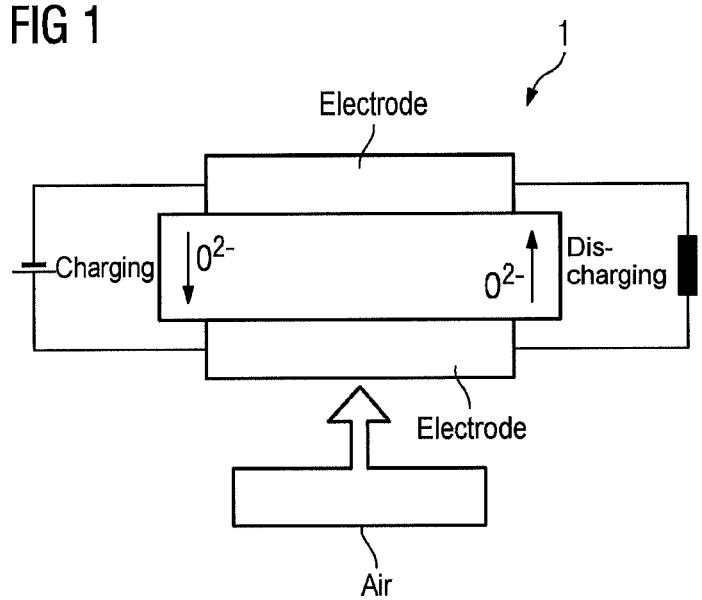
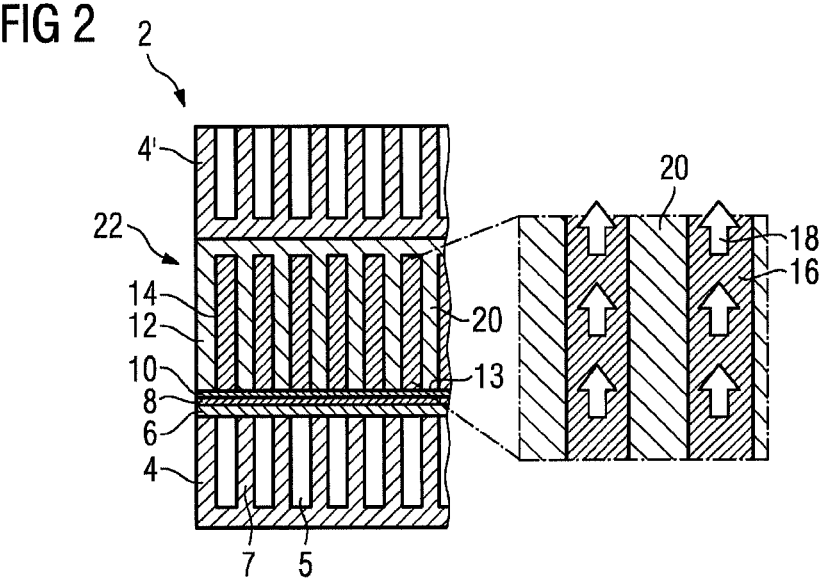

ELECTROCHEMICAL BATTERY

CROSS REFERENCE TO RELATED APPLICATIONS

This application is based on and hereby claims priority to International Application No. PCT/EP2010/069059 filed on Dec. 7, 2010 and German Application No. 10 2009 057 720.3 filed on Dec. 10, 2009, the contents of which are hereby incorporated by reference.

BACKGROUND

The invention relates to a battery and a method of operating a battery.

Rechargeable batteries, for example batteries based on lithium ions, have attained ever increasing importance in the portable world. A particularly important aspect is to continually increase the energy density which can be stored. The continually increased energy density also increases the risk of an internal short circuit and the resulting spontaneous energy discharge. In the most unfortunate case, spontaneous energy discharge from a battery can lead to fires which can cause considerable damage to the surroundings.

SUMMARY

One possible object is to provide a battery having a very high energy density and at the same time a high degree of process safety.

The inventors propose a battery having a first electrode, in the discharging process of the battery a cathode, and a second electrode which in the discharging process represents the anode, between which a solid state electrolyte is arranged, where process gas is supplied to the cathode side. The proposal is characterized in that a reservoir which is open to the second electrode and closed to an environment and comprises a porous, i.e. gas-permeable, oxidizable material and a redox pair which is gaseous at an operating temperature of the battery is arranged on the surface of the second electrode. The expression "closed to an environment" as used here means the opposite of supply of process gas in the form of, in general, air from the atmosphere. The second electrode is thus, in particular, closed off from the free atmosphere.

For the purposes of this discussion, an anode is the electrode at which an oxidation reaction takes place. Electrons from a chemical reaction are taken up and released via an electric connection. An electrochemical reaction always takes place at a phase boundary between an electrode, an ion-conducting solid state electrolyte or an electrolyte solution. The anode is therefore the positive electrode in electrolyses. (Electrolyses consume electric energy.)

In the case of electrochemical elements, like the battery described here, which produce electric energy, oxidation processes take place at the anode, i.e. the anions (negatively charged ions) coming from the electrolyte are discharged and uncharged atoms become cations. When the anode and cathode are connected to form a current circuit, electrons flow via this external connection to the cathode; in this external power circuit, the anode then acts as minus pole (this effect occurs, as described below, in batteries or in fuel cells).

In the case of a rechargeable battery (as is present in this case), the same electrode can alternately operate as anode or cathode, depending on whether the battery is being charged or discharged. However, each electrode retains the sign of its potential, so that the positive electrode operates as cathode during discharging of the battery, but as anode during charging of the battery. The negative electrode operates as anode during discharging and as cathode during charging.

The air-side electrode is then the positive electrode and the electrode on the side of the oxidizable material is the negative electrode.

In the following, unless indicated otherwise, the discharging state of the battery is described and the term first electrode is used synonymously with the term cathode and the term second electrode is used synonymously with the term anode.

The reservoir containing the oxidizable material is, in a preferred embodiment, arranged in a chamber formed by a support body which is in turn juxtaposed with the anode. The oxidizable material is preferably present in a porous form. Since this material undergoes an increase in volume during discharging of the battery due to uptake of oxygen and could therefore become detached from a solid state structure which conducts oxygen ions (e.g. the electrolyte), the oxygen is preferably supplied to the oxidizable material by diffusion of the gaseous redox pair. The redox pair is regenerated at the anode by uptake of oxygen from the electrolyte. The oxidizable material is preferably less noble than the material in the anode, so that the latter is protected from oxidation, which could lead to loss of conductivity of the anode and its mechanical destruction.

The power output of the battery relies on a cathode-side supply of process gas, and when this supply of process gas is disconnected, all discharging reactions are immediately stopped, particularly because when air is used as process gas, a nitrogen cushion is formed in the gas feed conduits of the cathode side and this cushion also protects the oxidizable material from further attack by oxygen by long diffusion paths e.g. in the case of rupture of the electrolyte. The battery thus has both a very high energy density and significantly higher safety than a conventional rechargeable battery in which both reactants are present in stored form.

In a preferred embodiment, the anode material simultaneously has electrical and ionic conductivity, with the two types of conductivity being able to be present in a single phase or in a plurality of phases. Here, an electrically conductive material is a material which, like a metal, displays electric conduction by flow of electrons. An electrolytically conductive material, on the other hand, displays conduction by pure ion transport.

It has also been found to be advantageous for the anode material to be in the form of a metal-ceramic composite, in particular a cermet. The use of a metal-ceramic composite enables an electrically conductive metal to be used in combination with an electolytically conductive material, for example a doped metal oxide. A single-phase system has the advantage that the total volume is available for both types of conduction, which reduces the resistance.

Furthermore, it has likewise been found to be advantageous for the electrically conductive material of the anode to have a greater electronegativity (or be able to be oxidized only at a higher oxygen partial pressure) than the oxidizable material in the reservoir or in the chamber of the support body. The oxidizable material in the chamber of the support body serves to store the process gas chemically and should be oxidized by the redox pair transported in gaseous form. This process is easier to configure chemically when this material has a lower electronegativity than the conductive material of the anode, so that this material of the anode is not unnecessarily involved in a redox reaction. In this context, it is also advantageous for the material to be oxidized of the chamber to be a metal.

In a further embodiment, the electronically conductive material of the anode is a metal such as nickel, manganese, molybdenum, tungsten or iron. Here, it once again preferably has to be ensured, as mentioned above, that the pairing of anode metal and oxidizable material is selected so that the anode metal has a higher electronegativity than the material to be oxidized.

In this context, it is also advantageous for the oxidizable material in the chamber to be a metal. Here, the metals lithium, manganese, iron or titanium or an alloy of these metals have been found to be useful.

At the operating temperature of the battery, which is particularly preferably in the range from 600° C. to 800° C., the redox pair is formed, in an advantageous embodiment, of hydrogen and water vapor. This leads during further operation to a reaction between the (gaseous) water with the oxidizable material in the chamber. Here, the oxidizable material is oxidized by the water, generally forming a metal oxide and hydrogen.

In an embodiment, the battery is provided on the positive side with a process gas distributor which advantageously distributes the process gas, generally air, uniformly at the cathode.

In another advantageous embodiment, the support body has a U-shaped cross section through which optionally perforated projections run, so that, firstly, continuous hollow spaces which allow gas transport of the redox pair and secondly provide electronic contact to the anode in order to transmit current to the cathode of an adjoining cell are formed in the direction of the anode. The oxidizable material, i.e. preferably one of the metals lithium, manganese, iron or titanium, preferably in a high-surface-area form, can be incorporated in the hollow spaces (which can also be configured as pores).

In a preferred embodiment, the chamber is again open to the anode so that the redox pair can flow with little hindrance into the chamber containing the oxidizable material.

The inventors further propose a method of operating a battery, wherein an electronegative gas is supplied to a first electrode, in the discharging process a cathode, the gas is converted at the interface between the cathode and the adjoining electrolyte layer (more precisely at the three-phase boundary between gas, ion conductor and electron conductor) into negative ions and then migrates in this form through the electrolyte layer to the anode (second electrode). At the interface between electrolyte and anode (or at a three-phase boundary between gas, ion conductor and electron conductor), the negative ions are converted by the reducing partner of a gaseous redox pair into the oxidizing partner. The electrons liberated are conducted away in the form of a flow of electric current. The gaseous oxidizing reaction product diffuses into the hollow spaces in which it reacts with the oxidizable material present there.

The method described again makes it possible to construct a battery having a comparatively high energy density since a reservoir of solid oxidizable material, which can be given a comparably large volume since due to gaseous products the process gas can be conducted away to its ultimate oxidation partner, is provided. The anode itself remains largely excluded from the reaction and is not consumed thereby. Furthermore, the method described has a high degree of process safety since rapid spontaneous discharging of the battery cannot occur when the process gas flow is interrupted.

In a further embodiment, the process gas is oxygen which reacts with the reaction partner hydrogen at the anode surface to form water. Here, the water which is present as gaseous vapor at the process temperature of the battery is conveyed to the oxidizable material, i.e. preferably to a metal, which is in turn oxidized to the metal oxide at the process temperature of the battery, and this reaction forms hydrogen in molecular form which migrates back to the anode and reacts afresh with the process gas oxygen present in ionic form to form water.

However, other redox pairs, for example ones also based on metal, which react according to the chemical equation $$X + O_2 \rightarrow XO_2$$

are in principle also advantageous for the method.

Furthermore, the method of operating a battery is preferably employed for a rechargeable battery, with the polarization of anode and cathode being reversed for the charging process of the battery and the redox process proceeding in the opposite direction so that the oxidizable material is reduced again.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 schematically shows a rechargeable battery having a solid state electrolyte and FIG. 2 schematically shows a battery having a solid state electrolyte and a reservoir of oxidizable material.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

FIG. 1 schematically shows a rechargeable battery 1 having oxide ion transport, viz. a rechargeable oxide ion battery (ROB), the principle of which also underlies the battery described here.

This comprises an electrode which forms the cathode in the discharging process, and a continuous stream of air, which represents the process gas, is supplied to the cathode. Furthermore, the battery comprises a further electrode, in the discharging process of the battery the anode, which is separated from the cathode by a solid state electrolyte, with ionic transport of oxygen ($O^{2-}$) occurring between anode and cathode.

This oxygen ion flow occurs from the cathode (process gas electrode) to the anode (coupled via the redox pair to the oxidizable metal) during the discharging process and in the opposite direction during the charging process, but with the polarity of the electrodes being retained. The operating temperature of this battery is in the range from 500° C. to 800° C., in particular about 600° C. This temperature is particularly advantageous for ionic transport in the solid state electrolyte.

An embodiment of such a battery is shown in more detail in FIG. 2. FIG. 2 shows a battery 2 having a gas distributor 4 which has guide ribs 7 between which gas channels 5 are located. The process gas is conveyed through the gas channels 5 and supplied to a cathode 6 (first electrode). At the cathode 6, the process gas, for example the oxygen of air, is reduced to $O^{2-}$ ions and conveyed by ionic conduction through a solid state electrolyte 8 to an anode 10 (second electrode). The solid state electrolyte advantageously is formed of a metal oxide, e.g. zirconium oxide or cerium oxide, which is in turn doped with a metal, e.g. scandium. The dopant serves to generate oxygen vacancies in the solid electrolyte for the transport of the ionized gas, e.g. $O^{2-}$.

At the surface of the anode 10, there is a preferably gaseous reducing agent, which can, in particular, be present as molecular hydrogen ($H_2$), with which the ionic oxygen $O^{2-}$ reacts to form $H_2O$ according to the following equation:

$$H_2 + O^{2-} \rightarrow H_2O + 2e- \qquad (eq. 1)$$

The electrons liberated flow via an electronically conductive support body 12 (for example of stainless steel) and via a bipolar plate 13 to the neighboring cell. This excess of electrons at the anode during discharging of the cell combined with the deficiency of electrons at the cathode leads to flow of electric current in the external circuit of the battery.

The gas distributor 4 with its gas channels 5 arranged between the guide ribs 7 has a total height in the order of about 1 mm. The cathode installed on the gas distributor 4 has a thickness in the order of about 100 µm. The cathode can, for example, be formed of a perovskite, for example $LaSrMnO_4$. The electrolyte 8, which usually has a layer thickness in the range from 30 µm to 50 µl, preferably 40 µm, is in turn installed on the cathode 6. This electrolyte can preferably be formed of a metal-doped metal oxide, as described above. On the electrolyte 8, there follows the anode 10 which has a layer thickness in the range from 40 µm to 60 µm, preferably 50 µm. The anode is preferably made of a metal-ceramic composite, known as a cermet. The anode 10 has metallic phases which ensure electronic conductivity. Advantageous metals for the metallic phase of the anode are lithium, manganese, iron, titanium or nickel. In addition, the anode optionally has an electrolytically conductive phase in the form of a metal oxide which can, for example, be in the form of zirconium oxide.

In conventional solid state batteries according to the prior art, which likewise transport an ionized gas such as oxygen ($O^{2-}$) through a solid state electrolyte, the negatively charged oxygen reacts to form the oxide of the material of the anode, with the latter being oxidized. This results in the anode material being consumed (oxidized). When the conductive anode material has been consumed, the battery has been discharged. However, in the present battery, a reaction partner for the oxygen ions, which is present in the form of hydrogen, is made available at the anode surface. As mentioned above, the oxygen reacts with the hydrogen to release electrons, with an equilibrium of $H_2$ and $H_2O$ being present at the anode surface. These comprise a redox pair which is present in gaseous form at the operating temperature of the battery cell.

A support body 12 is installed at a surface 13 of the anode 10; this support body optionally has perforated projections 20 which in turn separate chambers 16 from one another (cf. also enlarged section of FIG. 2). These chambers 16 are formed with an oxidizable material, preferably in the form of an elemental metal. This elemental metal, which is preferably selected from the group consisting of lithium, manganese, iron or titanium, is present as powder or as porous pressed bodies. The redox pair $H_2/H_2O$, which in the gaseous state serves as carrier material for the oxygen, diffuses (cf. arrows 18) through the chamber 14 (hollow space) into the oxidizable material 16 through the porosity of the latter and reacts with the oxidizable material 16 according to the following equation:

$$yH_2O + xMe \rightarrow Me_xO_y + yH_2, \qquad (eq. 2)$$

where Me is a metal. The metal Me should preferably have a lower electronegativity than the metal of the anode 10 which forms the electronically conductive phase there. If this is the case, the tendency for the ionized oxygen to react with the $H_2$ and for $H_2O$ formed therefrom to react with the oxidizable metal 16 is higher than the tendency to react with the anode metal, as a result of which the anode material is protected against oxidation.

The molecular hydrogen $H_2$ formed in this reaction migrates back to the anode 10 and reacts again at the anode 10 with the ionic oxygen $O^{2-}$ being formed there.

The redox pair $H_2/H_2O$ described here is a preferred redox pair, but can also be replaced by another redox pair whose components are present in sufficient concentration in gaseous or sometimes also liquid form at the operating temperature of the battery of about 600° C. A condition is that the oxidized component, analogous to the $H_2O$, undergoes an oxidation reaction with the oxidizable material 16 (e.g. MnFe) present in the chamber.

However, since air or the atmospheric oxygen present therein is the most advantageous process gas, a redox pair should react according to the following reaction equation, $$nX + m/2 O_2 \rightarrow X_nO_m, \qquad (eq. 3)$$

where X can be a further suitable chemical element. This chemical reaction equation should have the following properties:

1. $\Delta G_{X,XnOy} \approx \Delta G_{Me,MepOq} \qquad (eq. 4)$ i.e. the Gibbs free energy liberated in the reaction (the reaction of the redox pair $X:XO_2$) should correspond approximately to the free Gibbs energy of the reaction between the metal and the metal oxide formed by the oxidation of the metal Me according to equation 2.

2. The partial pressure $p_x$ and the partial pressure $p_{XnOm}$ have to be high enough to generate a current density in the region of about 0.04 A/cm². Thus, in the case of the redox pair $H_2/H_2O$, the component present with the lower pressure in the equilibrium at the potential of the negative electrode should reach at least $10^{-8}$ bar for gas-kinetic reasons. This leads, for example in the case of a manganese electrode at 600° C. (1.25 V), to at least $p_{H2O} = 10^{-8}$ bar and $p_{H2} = 10^{-5}$ bar. It is accordingly advantageous to select the partial pressures as follows: $p_{H2} = 1$ bar and $p_{H2O} = 10^{-3}$ bar.

Possible alternatives to the redox system $H_2/H_2O$ are, for example, metal vapors and their volatile oxides (e.g. $CO/CO_2$), hydroxides or hydrides.

The advantage of such a battery structure is that a high current density can be achieved. Furthermore, the course of the reaction is dependent on the inflowing process gas. As soon as the flow of process gas is stopped, the battery can no longer generate current and uncontrolled discharging with uncontrolled evolution of heat through to a fire also cannot occur.

The structure of the battery 2 is also suitable, in particular, for a stack structure as indicated in FIG. 2 by a further gas distributor 4' which represents the lower part of a further cell being arranged above the support body 12. The base area of a cell can be, for example, 150 mm×150 mm.

The total battery 2 is thermally insulated and encapsulated since the operating temperature is about 600° C. In the case of recuperation of the heat carried in the process offgas on the process gas inlet side by a heat exchanger and a sufficiently large volume-to-surface ratio with good insulation of the total battery 2, the operating temperature can be maintained purely by the inevitable power loss occurring as a result of the internal resistances in the battery. A small current optionally has to be maintained in non-load operation in order to prevent slow cooling.

A battery as described is particularly suitable as stationary energy store in long-term operation. However, it can also serve to take up excess energy from the grid, for example when wind turbines or other renewable energy sources produce energy and this energy is not required in the grid. Thus, excess energy from renewable energy sources can be stored in such batteries.

To store energy in such a battery 2, i.e. to charge the battery 2, the current direction between the first electrode and the second electrode is reversed so that the first electrode becomes the anode and the second electrode becomes the cathode. As a result, electrons are introduced in the region of the support body 12 or the material which is in this case oxidized in the $Me_mO_n$ (cf. eq. 2), with the $Me_mO_n$ being reduced to Me. The overall reaction process is reversed in that the transport of ionic oxygen $O^{2-}$ occurs from the second electrode 10 through the electrolyte 8 in the direction of the first electrode 6 where the oxygen ions release their negative charge again and leave the electrode (now the anode) as oxygen gas in the direction of the gas distributor 4.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A battery comprising:
   a first electrode supplied with a process gas;
   a second electrode;
   a solid state electrolyte positioned between the first and second electrodes;
   a reservoir which is open to the second electrode and closed to an environment;
   a gas-permeable, oxidizable material arranged within the reservoir;
   a redox pair present within the reservoir and on a surface of the second electrode, the redox pair being gaseous at an operating temperature of the battery, wherein the redox pair is based on hydrogen and water and a reaction between the water and the oxidizable material takes place; and
   an electrically conductive support body that encloses the reservoir and is arranged on the second electrode.

2. The battery as claimed in claim 1, wherein the support body forms a plurality of chambers in which the oxidizable material is provided.

3. The battery as claimed in claim 1, wherein the second electrode is formed from at least one electrically conductive material that has a greater electronegativity than the oxidizable material in the reservoir.

4. The battery as claimed in claim 1, wherein the oxidizable material is a metal.

5. The battery as claimed in claim 4, wherein the oxidizable material is formed of at least one metal selected from the group consisting of lithium, manganese, iron, titanium and alloys thereof.

6. The battery as claimed in claim 1, wherein the second electrode is formed from at least one material selected from the group consisting of nickel, manganese, molybdenum, tungsten and iron.

7. The battery as claimed in claim 1, further comprising a process gas distributor arranged on the first electrode to supply process gas to the first electrode.

8. The battery as claimed in claim 1, wherein the process gas is air.

9. The battery as claimed in claim 1, wherein
   a support body encloses the reservoir and is arranged on the second electrode, and
   the support body has a U-shaped cross section through which one or more projections run and separate the reservoir into at least two separate chambers.

10. A battery comprising:
    a first electrode supplied with a process gas;
    a second electrode;
    a solid state electrolyte positioned between the first and second electrodes;
    a reservoir which is open to the second electrode and closed to an environment;
    a porous gas-permeable, oxidizable material arranged within the reservoir;
    a redox pair present within the reservoir and on a surface of the second electrode, the redox pair being gaseous at an operating temperature of the battery, wherein the redox pair is based on CO and CO2 and a reaction between the CO2 and the oxidizable material takes place; and
    an electrically conductive support body that encloses the reservoir and is arranged on the second electrode.

11. The battery as claimed in claim 10, wherein the support body forms a plurality of chambers in which the oxidizable material is provided.

12. The battery as claimed in claim 10, wherein the second electrode is formed from at least one electrically conductive material that has a greater electronegativity than the oxidizable material in the reservoir.

13. The battery as claimed in claim 10, wherein the oxidizable material is a metal.

14. The battery as claimed in claim 13, wherein the oxidizable material is formed of at least one metal selected from the group consisting of lithium, manganese, iron, titanium and alloys thereof.

15. The battery as claimed in claim 10, wherein the second electrode is formed from at least one material selected from the group consisting of nickel, manganese, molybdenum, tungsten and iron.

16. The battery as claimed in claim 10, further comprising a process gas distributor arranged on the first electrode to supply process gas to the first electrode.

17. The battery as claimed in claim 10, wherein the process gas is air.

18. The battery as claimed in claim 10, wherein
    a support body encloses the reservoir and is arranged on the second electrode, and
    the support body has a U-shaped cross section through which one or more projections run and separate the reservoir into at least two separate chambers.

* * * * *